US009616349B2

(12) United States Patent
Boshears et al.

(10) Patent No.: US 9,616,349 B2
(45) Date of Patent: Apr. 11, 2017

(54) METHOD OF MANAGING LOADING, UNLOADING, AND ROUTING OF TRACKLESS VEHICLES AND SYSTEM USING THE SAME

(71) Applicant: Oceaneering International, Inc., Houston, TX (US)

(72) Inventors: Michael Wayne Boshears, Orlando, FL (US); Michael David Russell, Jr., Orlando, FL (US); Andrew Scott Grant, Orlando, FL (US); Frank Peter Hass, Orlando, FL (US)

(73) Assignee: Oceaneering International, Inc., Houston, TX (US)

( * ) Notice: Subject to any disclaimer, the term of this patent is extended or adjusted under 35 U.S.C. 154(b) by 0 days.

(21) Appl. No.: 14/074,701

(22) Filed: Nov. 7, 2013

(65) Prior Publication Data

US 2014/0129074 A1    May 8, 2014

Related U.S. Application Data

(60) Provisional application No. 61/723,555, filed on Nov. 7, 2012.

(51) Int. Cl.
*A63G 31/00* (2006.01)
*A63G 25/00* (2006.01)

(52) U.S. Cl.
CPC ................... *A63G 31/00* (2013.01)

(58) Field of Classification Search
CPC .................. A63G 31/00; A63G 25/00
See application file for complete search history.

(56) References Cited

U.S. PATENT DOCUMENTS

| 5,168,451 A | 12/1992 | Bolger |
| 5,283,739 A | 2/1994 | Summerville et al. |
| 5,583,844 A * | 12/1996 | Wolf ..................... A63G 31/16 |
| | | 472/43 |
| 6,095,926 A | 8/2000 | Hettema et al. |
| 2001/0047237 A1 | 11/2001 | Nakagawa et al. |
| 2005/0048446 A1 | 3/2005 | Fromyer et al. |
| 2007/0106484 A1* | 5/2007 | Sweatman et al. ........... 702/188 |

(Continued)

FOREIGN PATENT DOCUMENTS

| CN | 102046446 A | 5/2011 |
| EP | 2437129 A2 | 4/2012 |
| WO | 2009145552 A2 | 12/2009 |

*Primary Examiner* — Basil T Jos
(74) *Attorney, Agent, or Firm* — Dentons US LLP (57) ABSTRACT

Method and system of determining if a predetermined amount of time has passed since dispatch of a first one of the plurality of trackless vehicles onto one of a predefined plurality of intersecting paths. If the predetermined amount of time has passed, determining if a second one of the plurality of trackless vehicles was available for dispatch onto the predefined path or another predefined path. If the second trackless vehicle was available for dispatch, dispatching the second trackless vehicle, and if the second trackless vehicle was not available for dispatch, dispatching a third one of the trackless vehicles onto the predefined path or another predefined path. The predetermined amount of time may be calculated based on a time interval on which the trackless vehicles are dispatched onto the predefined plurality of paths.

22 Claims, 3 Drawing Sheets

(56) References Cited

U.S. PATENT DOCUMENTS

2008/0228562 A1     9/2008  Smith et al.
2009/0327011 A1*   12/2009  Petroff ............................. 705/8
2010/0026484 A1     2/2010  King et al.

* cited by examiner

METHOD OF MANAGING LOADING, UNLOADING, AND ROUTING OF TRACKLESS VEHICLES AND SYSTEM USING THE SAME

CROSS REFERENCE TO RELATED APPLICATIONS

This application claims the benefit of the filing date of U.S. Provisional Application Ser. No. 61/723,555, filed on Nov. 7, 2012, the entire contents of which is incorporated by reference herein.

FIELD OF THE INVENTION

The present invention is directed to trackless vehicles that repeatedly move through a predefined area. More specifically, the present invention is directed to methods of managing the dispatch of vehicles to and from loading, unloading, and other stations, to maximize a number of vehicles moving through the predefined area. In the amusement park ride field, use of the methods described herein maintain the ride's time interval, and prevents a backup of the ride due to a backup of ride vehicles at any location in the ride. The present invention is also directed to systems employing the methods described herein.

BACKGROUND OF THE INVENTION

Amusement park attractions, in which patrons move through the attraction in ride vehicles, typically include a set number of ride vehicles. The set number is determined based in part on limitations imposed by the physical space available to the entire attraction, the amount of money an amusement park has allotted to the attraction, the number of patrons which the ride operator desires to move through the attraction per hour (sometimes referred to as ride throughput) and anticipated downtime of ride vehicles due to scheduled and unscheduled maintenance. Ride vehicles undergoing scheduled or unscheduled maintenance are typically removed from patrons' view. The maintenance may take place in a holding or maintenance area, which would be separate from any loading, unloading, and show areas of the attraction.

Until recently, most amusement parks made use of ride vehicles that were mechanically coupled to a track and/or an electrical bus bar. Older ride vehicles, or groups of ride vehicles connected like train cars, might be coupled to a mechanical cable or chain. The cable or chain would pull the ride vehicle or group of ride vehicles through the ride. To stay on a given path throughout the ride, the ride vehicles could travel on tracks or be constrained to follow a channel on the floor of the ride, through which the vehicle was coupled to the cable or chain. More modern attractions utilize electric motors on each vehicle or group of vehicles to power drive wheels thereon. When connected to an electrical power source, the electric motors provided the locomotive motion to propel the ride vehicles through the ride. These vehicles were constrained to travel on a track, in order to maintain a substantially fixed distance from an electrical bus bar which often would be positioned next to the track. Electrical power was fed to the vehicle from the bus bar via an electrically conductive brush bridging between the vehicle and the bus bar.

More recently, ride vehicles have been developed that carry their own stored power in the form of electrical battery cells. These vehicles eliminate the need for an electrical bus bar, such as that described above. Battery operated ride vehicles can travel with or without tracks through a ride under their own power. If the vehicle travels without tracks, it will typically travel on wheels. A ride vehicle that travels through an attraction without being restricted to travel on a track is referred to as a "trackless ride vehicle."

Trackless ride vehicles may travel through the ride along a floor that has a wire embedded below the surface of the floor, or adhered to the surface of the floor. The wire defines a path on which the vehicle travels. Typically, signals emitted from the wire are used to maintain the location of the vehicle on the path. Although wire-guided trackless ride vehicles eliminate the need for a track, they are, for practical purposes, still limited to following the path defined by the wire. Wired paths cannot cross each other, and cannot be easily moved to reconfigure paths through the ride.

All attractions, also referred to as amusement rides, require places for passengers to load and unload from the ride vehicles used in the attraction. Because ride vehicles have been constrained to travel on tracks or to follow a wire, ride vehicles have typically proceeded serially, one after another, along a closed loop in the attraction. The serial procession of ride vehicles proceeds from the loading area, through a show area 132, to an unloading area and, if the loading and unloading areas are not the same area, back to the loading area. This serial procession of ride vehicles is undesirable.

As stated above, amusement attractions typically have a predetermined set number of ride vehicles. Accordingly, this predetermined number of ride vehicles (less a subset undergoing maintenance) travel continuously around the above described loop. Time is provided at the loading/unloading areas for passengers to embark and disembark from their vehicles, at the beginning and ending points on the loop, respectively. However, this time may not be sufficient, for example, if it takes one passenger a greater than normal amount of time to fasten his seatbelt at the loading area, or, again for example, if a ride operator requires a greater than normally allotted time to clean a vehicle at the unloading area (perhaps due to unwanted material left by a sick passenger).

In some attractions, vehicles may form subsets which all load/unload together. The subset of vehicles behind the stopped vehicles may be spaced back from the stopped vehicles to allow time for normal loading/unloading. However, if the stopped vehicles are not in a state to be restarted, once that time has expired, action must be taken to prevent following vehicles from entering the loading/unloading areas. Accordingly, a ride operator must stop the approaching subset of vehicles. The longer the delay in restarting the vehicles in the loading/unloading area becomes, the greater the number of vehicles that must be stopped before they enter the loading/unloading area. As the delay continues, and because all vehicles are constrained to travel serially on a single loop, the number vehicles that should have entered the loading/unloading area, but for the delay of restarting the vehicles in the loading/unloading area, begins to grow and form what might be referred to as a log-jam, backlog, backup, or stoppage. Alternatively, for example when vehicles may not form subsets, the ride operator must stop all of the vehicles in the ride simultaneously. In either situation, ride throughput, that is the number of patrons passing through the ride per hour, deteriorates, and an attractions time interval, which will be described later herein, cannot be maintained.

This problem exists even in rides that permit passengers to load or unload adjacent to a moving platform, in attractions that may have been designed to maintain continuous travel of ride vehicles at a fixed velocity through the loading/unloading and show areas of a ride. In such attractions, the passenger may step from a fixed platform to a moving platform adjacent to an empty ride vehicle. The relative velocity between the passenger and the ride vehicle may be zero or close thereto. However, the velocity of the vehicle relative to the loop will be greater than zero. The passenger can, theoretically, enter the ride vehicle before the moving platform ends, while the ride vehicle continues at a constant velocity through the attraction. If, however, at the end of the moving platform, the passenger is not securely in the ride vehicle, the ride operator must stop the entire ride to give that passenger time to settle into the vehicle. In other words, the entire serial procession of ride vehicles in the attraction must be stopped, at least to ensure the safety of the unseated passenger. In this situation, ride throughput deteriorates, and the attraction's time interval cannot be maintained.

A reduction in ride throughput is a real problem for all amusement rides, especially those popular rides that have a great number of people waiting in line to experience the ride. The greater the number and length of delays, the longer those people waiting in line will be required to wait.

Most recently, an innovative navigation system has been integrated with a trackless ride vehicle. The navigation system allows the ride vehicle to navigate anywhere on the floor of an amusement ride without any need to follow a track or a wire.

What is needed is a method and system of managing the throughput of an amusement attraction to avoid or eliminate backlogs due to delayed ride vehicles in loading and/or unloading areas. The needed method and system could ensure continuous travel of ride vehicles through the ride without a need to stop the ride due to backlogs. The method could maximize throughput and ensure that an attraction's time interval was maintained. These methods and systems are likewise needed in non-amusement park ride environments.

BRIEF SUMMARY OF THE INVENTION

The present invention obviates the aforementioned problems and deficiencies of conventional vehicles that transport people or cargo through predefined areas. Amusement park attractions, particularly those attractions utilizing tracked and wire-guided trackless ride vehicles, would benefit from implementation of the invention; however the invention is not limited to use in amusement park attractions.

In accordance with an embodiment of the invention, a method of dispatching a plurality of trackless vehicles, may include determining, by a controller, if a predetermined amount of time has passed since the controller dispatched a first one of the plurality of trackless vehicles onto one of a predefined plurality of intersecting paths. If the predetermined amount of time has passed, the controller may determine if a second one of the plurality of trackless vehicles was available for dispatch onto one of the one predefined path and another of the predefined plurality of intersecting paths. If the second trackless vehicle was available for dispatch, the controller may dispatch the second trackless vehicle, and if the second trackless vehicle was not available for dispatch, the controller may dispatch a third one of the plurality of trackless vehicles onto one of the one predefined path and another of the predefined plurality of intersecting paths. The predetermined amount of time may be calculated based on a time interval on which the trackless vehicles are dispatched onto the predefined plurality of intersecting paths. The time interval may be fixed or variable. The destination of the plurality of trackless vehicles upon dispatch may be a staging area located prior to the predefined path. The third trackless vehicle may be stationed at a location separate from the location of the second trackless vehicle.

In accordance with another embodiment of the invention, a method of dispatching a plurality of trackless vehicles may include transmitting, from a controller, a first instruction to a first one of the plurality of trackless vehicles to begin travel at a predefined time along one of a plurality of predefined intersecting paths; transmitting, at the end of the one of the predefined intersecting paths, a second instruction to the first one of the plurality of trackless vehicles to travel along a second one of a plurality of predefined intersecting paths. The predefined time may be established according to a predefined time interval, which may be a fixed or variable time interval. In an embodiment, the first instruction may be based on a predefined time interval and the second instruction may be based on predefined event conditions. The second one of a plurality of predefined intersecting paths may lead to at least one of a first and a second station.

In still another embodiment, the trackless vehicle may be an amusement park type ride vehicle; and if the ride vehicle carried passengers into the ride, the ride vehicle might proceed to the first station for passenger unloading; and if the ride vehicle did not carry passengers into the ride, the ride vehicle might proceed to the first station or the second station. In some embodiments, the first and second stations may be different stations. In some embodiments, the second station may be a passenger loading station.

In still another embodiment, a system configured to maximize a number of trackless vehicles traveling through a predetermined area at a given time, may include a plurality of trackless vehicles, each configured to automatically navigate along any of a plurality of pre-programmed intersecting paths. The system may further include a first station configured to receive at least a first one of the plurality of trackless vehicles and a second station configured to receive at least a second one of the plurality of trackless vehicles. The system may further include a controller configured to periodically dispatch trackless vehicles into the predetermined area in accordance with a predetermined time interval. Additionally, in order to maximize the number of trackless vehicles in the predetermined area at a given time, either: the first one of the plurality of trackless vehicles begins to navigate along a first subset of the plurality of pre-programmed intersecting paths at a predetermined time in accordance with the time interval, or the second one of the plurality of trackless vehicles begins to navigate along a second subset of the plurality of pre-programmed intersecting paths at the predetermined time in accordance with the time interval.

The time interval may be fixed or variable. In some embodiments, the system may further include a third station, wherein the second one of the plurality of trackless vehicles begins to navigate along a third subset of the plurality of pre-programmed intersecting paths to the third station at the predetermined time in accordance with the time interval. In some embodiments, the first and second stations are the same station. Furthermore, in accordance with some embodiments, an order of departure of more than one trackless vehicles from the first station is not dependent on an order of arrival of the more than one trackless vehicles at the first station. Likewise, an order of departure of more than one trackless vehicles from the second station is not dependent on an order of arrival of the more than one trackless vehicles at the second station. In some embodiments, the controller may dispatch one or more of the plurality of the trackless vehicles into the predetermined area at the same time. In still other embodiments, the first and second stations may each be comprised of multiple slots or zones, each slot or zone configured to receive one of the plurality of trackless vehicles.

BRIEF DESCRIPTION OF THE DRAWINGS

Several figures are provided herein to further the explanation of the present invention. Although the figures are depict embodiments useful in the amusement park ride field, the invention is not limited to that field.

DETAILED DESCRIPTION

It is to be understood that both the foregoing general description and the following detailed description are exemplary. As such, the descriptions herein are not intended to limit the scope of the present invention. Instead, the scope of the present invention is governed by the scope of the appended claims.

The present invention obviates certain problems and deficiencies associated with conventional tracked and wire-guided vehicles. Exemplary embodiments in accordance with the invention are described in terms of vehicles used in amusement park attractions (hereinafter referred to as "rides"), but the use of the invention is not limited to that field. Embodiments of the present invention incorporate methods useable by non-wire guided trackless ride vehicles (hereinafter referred to as "ride vehicles") that integrate at least one navigation system that allows the ride vehicle to navigate to any point on the floor of a ride without any need to have or to follow a track or a wire. Of course, the point on the floor must be accessible to the ride vehicle. Such ride vehicles may transport patrons through at least some of the ride.

Figure 1:
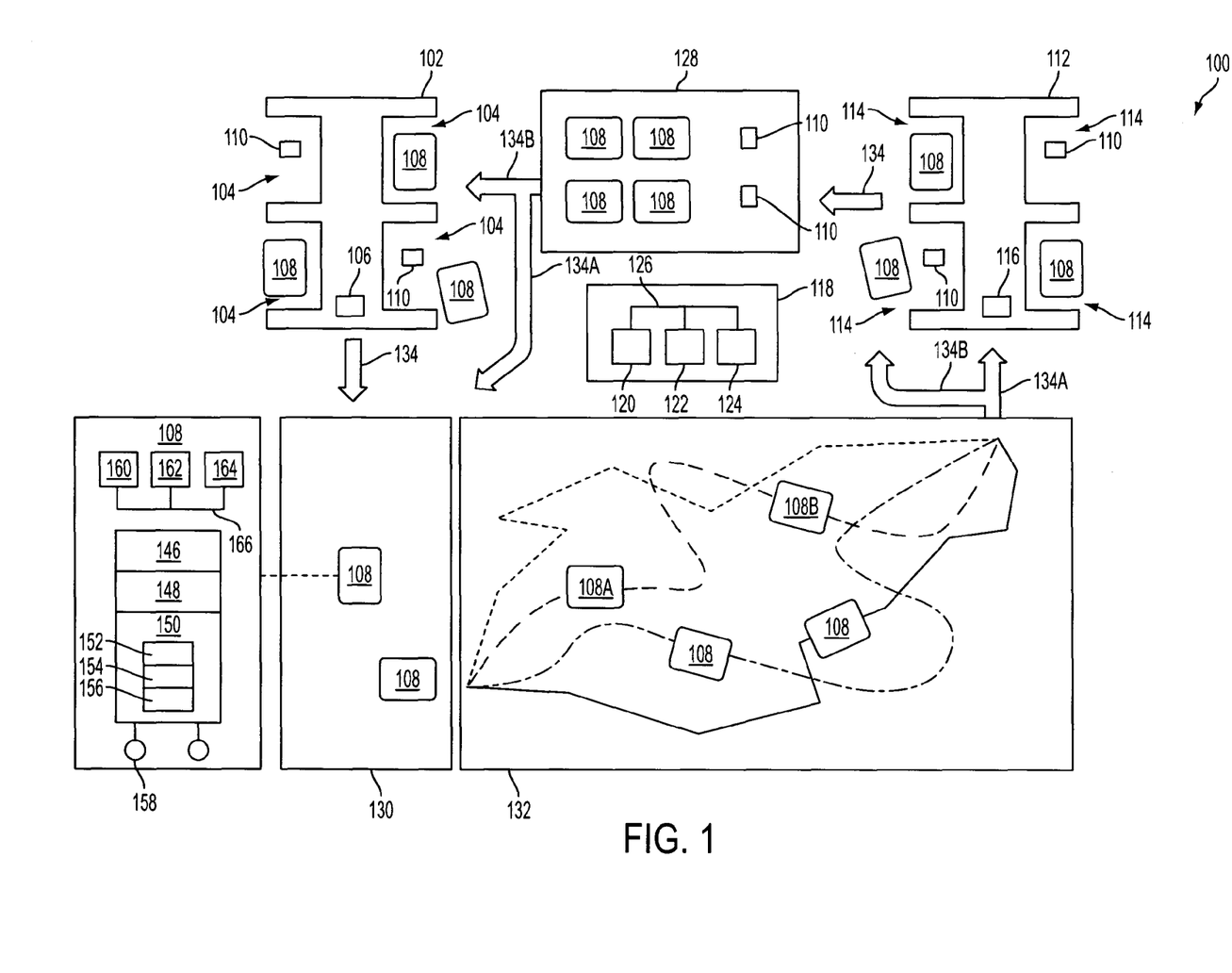
FIG. 1 illustrates a system configured to utilize a method for dispatching trackless ride vehicles in a ride in accordance with an embodiment of the invention.

FIG. 1 illustrates a system 100 configured to utilize a method in accordance with an embodiment of the invention. The method may include dispatching ride vehicles 108 from any of a number of pre-designated or predetermined areas. The pre-designated areas may be referred to, for example, as a load station 102, an unload station 112, a holding area 128, or a staging area 130. These names are not limiting as to the activities performed therein. For example, the holding area 128 may be a place to hold empty ride vehicles waiting to be dispatched to another area, but may additionally or alternatively be a place in which maintenance on certain ride vehicles is conducted. Moreover, the number of pre-designated areas is not limited to the four areas mentioned above. For example, a ride may not use a staging area 130. As an additional example, a ride might use two holding areas 128, one for holding ride vehicles that are ready for passengers and one holding ride vehicles ready for, or undergoing, maintenance. Alternatively, one holding area 128 might be divided into two sub-areas, one for holding ride vehicles that are ready for passengers and one holding ride vehicles ready for, or undergoing, maintenance. By way of still another example, a ride may not make use of separate loading 102 and unloading 112 stations. The loading and unloading operations might be conducted at one station. Other possibilities and combinations of predetermined areas (e.g., 102, 104, 112, 130) are within the scope of the invention.

The system 100 may include a predetermined number of ride vehicles 108. As presented in one exemplary embodiment, a ride vehicle 108 may be a passenger vehicle. By way of example, the passenger vehicle may be comprised of a passenger cabin 146, a motion base 148 supporting the passenger cabin 146, and a propulsion platform 150 supporting the motion base 148. The propulsion base 150 preferably includes on-board motion 152 and navigation 154 units, batteries 156, and at least one electrically driven propulsion wheel 158. In addition to providing the motive force to move the ride vehicle through the ride, the propulsion wheel 158 may also be steerable, so that it can be used to both propel and steer the ride vehicle. In a preferred embodiment, the ride may be an amusement ride that conveys passengers through the amusement attraction and that adds additional motion experiences to the passenger cabin, such as one or more of roll, pitch, yaw, sway, and heave. Each ride vehicle is self-propelled and is not guided by a track or a wire. In one embodiment, each ride vehicle navigates itself from point to point using a pre-programmed set of instructions comprising instructions related to, for example, speed of rotation of a wheel, degree of rotation of the wheel, and pointing angle of the wheel. In a preferred embodiment, a ride control system 118 (also referred to as a controller) compares an expected location of the ride vehicle 108 to a location of the vehicle as determined from a set of sensors on the vehicle 108 and devices embedded in the floor of the attraction. Each ride vehicle may be referred to as a non-wire-guided trackless ride vehicle, or for sake of brevity hereinafter, as a "ride vehicle." In a preferred embodiment a ride includes a predetermined number of ride vehicles. For example, in one embodiment, there may be twenty ride vehicles 108; some of which are available for passenger transport and some of which are unavailable due to scheduled or unscheduled maintenance.

The system 100 may include a load station 102 including four loading slots 104. A greater or lesser number of loading slots 104 is within the scope of the invention. The load station 102, and/or each loading slot 104 may include one or more signaling devices 106 to permit a ride attendant to signal a ride control system 118 (or operator of the ride control system 118) that a given ride vehicle 108 is available for dispatch from a given loading slot 104. Each loading slot 104 may include a charging interface 110, which may be configured to provide electrical power to the ride vehicle 108 for the purpose of charging the ride vehicle's batteries while the ride vehicle 108 is operationally coupled to the charging interface 110 during loading operations. Passengers may load onto one or more ride vehicles 108 at the load station 102.

The system 100 may include an unload station 112 including four unloading slots 114. A greater or lesser number of unloading slots 114 is within the scope of the invention. The number of unloading slots 114 may be greater than, equal to, or less than the number of loading slots 104. The unload station 112, and/or each unloading slot 114 may include one or more signaling devices 116 to permit a ride attendant to signal the ride control system 118 (or operator of the ride control system 118) that a given ride vehicle 108 is available for dispatch from a given unloading slot 114. Each unloading slot 114 may include a charging interface 110, which may be configured to provide an electrical power to the ride vehicle 108 for the purpose of charging the ride vehicle's batteries while the ride vehicle is operationally coupled to the charging interface 110 during unloading operations. Passengers may unload from one or more ride vehicles 108 at the unload station 112.

In a preferred embodiment, there is one load station 102 and one unload station 112, each including multiple areas for loading/unloading passengers. Herein, these areas are referred to as slots and are illustrated in FIG. 1 as being similar in some respects to boat docks, however these slots may take any form. The exemplary illustration of FIG. 1, there are four loading slots 104 at a load station 102 and four unloading slots 114 at an unload station 112. Other numbers and combinations of loading and unloading slots per station are within the scope of the invention.

In one embodiment, a holding area 128 may be a physical location or area in the ride, typically separate from the show area 132 and from observation by passengers waiting, for example, at the loading and unloading stations. In the holding area 128, empty ride vehicles (i.e., ride vehicles not carrying passengers) may wait until they are needed. The ride control system 118 can dispatch ride vehicles in any order from the holding area 128. Typically, ride vehicles are dispatched into and out of the holding area in accordance with the ride's time interval. Likewise, ride vehicles are dispatched out of the loading area in accordance with the ride's time interval. In one embodiment, empty ride vehicles 108 may be dispatched from the holding area to either: a) a loading slot for passenger loading operations; or b) a staging area or directly into the show area 132 of the ride according to the time interval of the ride.

As indicated above, the system 100 may include a ride control system 118. The ride control system 118 may be comprised of a processor 120, a memory 122, and wireless communication device 124, all operationally coupled to a communications bus 126. The processor 120 may execute commands stored in the memory 122. The commands may cause the processor 120 to execute commands associated with the wireless communication device 124 to communicate with each of the ride vehicles 108 and/or the one or more signaling devices 106, 116. In a preferred embodiment, the ride control system 118 may be a processor-based system responsible for overall traffic management of the ride. The ride control system 118 may assign a ride path and a ride profile to each ride vehicle prior to the ride vehicle entering the show area 132 of the ride. Other times for assigning the ride path and the ride profile to each ride vehicle are within the scope of the invention. The ride control system may determine which ride vehicles are dispatched (e.g., a specific ride vehicle at a load station, an unload station, a holding area, a staging area, an exit of the show area 132, or even from any waypoint in the ride), and the times of their dispatch. Ride vehicles may be dispatched according to the ride's time interval. That is, ride vehicles may be dispatched to maintain the ride's time interval.

A ride path may be a predetermined path of a ride vehicle in a ride. A ride can include multiple ride paths. For example, in one embodiment, there may be four different ride paths 136, 138, 140, 142. Multiple spaced apart (with respect to an entry time into the show area 132) ride vehicles can traverse the same ride path at the same time. Ride paths may intersect, or cross over, other ride paths.

A ride profile may be a predetermined pattern of motion, including ride vehicle pitch, roll, and yaw. In some embodiments, the ride profile may additionally, or alternatively, include heave, sway, and surge. In some embodiments, two vehicles, successively travelling along the same ride path, may implement different ride profiles. Different ride profiles may be used to accommodate passengers who prefer to experience greater or lesser of aggressiveness of motion changes during the ride.

In a preferred embodiment, the time interval dictates the pace of the ride's show. The time interval may be fixed or variable. The time interval may be changed dynamically. In one embodiment, the time interval may be an amount of time between dispatches of successive ride vehicles into the show area 132 of the ride. Once a ride vehicle dispatched into the ride, the ride vehicle will travel along its assigned ride path until the end of the ride. In one embodiment, the time interval is based on a 72-second period. According to the embodiment, a ride path is assigned to a ride vehicle based on when the ride vehicle is available for dispatch into the show area 132 of the ride. Any given ride vehicle's ride path may depend on where the given ride vehicle is in relation to the periodic cycle of the time interval.

Each ride vehicle 108 may, similar to the ride control system 118, include a processor 160, a memory 162, and a wireless communication device 164, all operationally coupled to a communications bus 166 to permit the ride vehicle 108 to receive and execute commands from the ride control system 118 and to transmit data to the ride control system 118. Each ride vehicle 108 may also include its own battery power storage system 152 and various components required for self-propulsion and navigation 154, 156. The processor of a ride vehicle 108 may perform processes and execute commands related to power regulation, self-propulsion, and navigation.

In accordance with a preferred embodiment, the system 100 may include a holding area 128. In one embodiment, the holding area 128 is comprised of an area of floor space in the attraction that is designated to hold empty ride vehicles 108 that are ready for passengers. In a preferred embodiment, the holding area 128 does not include charging interfaces 110; however, the holding area 128 may include one or more charging interfaces 110 without departing from the scope of the invention. It will be noted that, charging interfaces 110 can be placed in the system 100 at locations where the propulsion platform of an ride vehicle 108 is required to remain in one location, such as when the ride vehicle 108 is at a location within the show area 132 where media is presented to passengers in the cabin of the ride vehicle 108. It will be further noted that the when the prolusion platform remains in one location, the cabin, which is mounted atop a motion platform, which is mounted atop the propulsion platform, may be moving, for example, in roll pitch and/or yaw. As described above, charging interfaces 110 shown in dashed line in holding area 128, provide electrical couplings to ride vehicles 108 for the purpose of charging the ride vehicles' 108 batteries while the ride vehicles 108 are operationally coupled to a respective charging interface 110.

A ride vehicle 108 may proceed through the ride along a ride path. As used herein, a ride path may be a predetermined route in the show area 132. A ride can include multiple ride paths. Ride paths may intersect. For example, in the embodiment of FIG. 1, there are four different ride paths 136, 138, 140, 142, each intersecting with the other at multiple locations. Multiple spaced apart ride vehicles can traverse the same ride path at the same time as illustrated in FIG. 1 by ride vehicles $108_A$ and $108_B$ as well as traverse different ride paths at different times. Additionally, the ride path along which a ride vehicle travels may be divided into a plurality of points, and/or a plurality of segments. Any point on the ride path may be designated as a way point. In some embodiments, a way point may coincide with a location in the show area 132 at which the passengers of the ride vehicle experience a beginning or ending of a show scene.

The ride control system 118 may dispatch a ride vehicle 108 from any point in the ride to any other point in the ride. Accordingly, a ride vehicle 108 can be dispatched, for example, from a way point within the show area 132 to the holding area 128 for maintenance.

In one embodiment, the ride control system 118 may dispatch a ride vehicle 108 into the staging area 130 from either a loading slot 104 or the holding area 128. A ride vehicle 108 dispatched from the loading slot 104 typically contains passengers. A ride vehicle 108 dispatched from the holding area 128 typically contains no passengers. A ride vehicle 108 dispatched from the holding area 128 may be referred to herein as an "empty ride vehicle" 108.

The ride control system 118 may be configured to maintain a predetermined time interval between dispatches of successive ride vehicles 108 into the show area 132. In one embodiment, the ride control system 118 may accumulate ride vehicles 108 in the staging area 130. By dispatching a given number, N, of ride vehicles 108 to the staging area 130 from either a loading slot 104 or the holding area 128, the ride control system 118 can ensure that it will be able to dispatch a ride vehicle 108 (regardless of whether the ride vehicle has passengers or is empty) into the show area 132 at the beginning of each of the next N time intervals. Accordingly, by accumulating ride vehicles 108 in the staging area 130 and releasing them into the show area 132 according to the time interval, or alternatively, by dispatching ride vehicles from a loading slot 104 or a hold area 128 such that a succession of the ride vehicles enters the show area 132 in accordance with the time interval, the show area 132 maintains a flow of ride vehicles 108 therethrough and backlogs due to delays of ride vehicles 108 at the load station 102 are prevented.

For example, in one embodiment of the invention, the time interval is 72 seconds. In this exemplary embodiment, the ride control system 118 dispatches an ride vehicle 108 from the staging area 130 into the show area 132 every 72 seconds; an ride vehicle is dispatched into the show area 132 at the beginning of every 72-second slot. Assuming at time t=0 there are two ride vehicles in the staging area 130, the ride control system can determine that a third ride vehicle 108 must be present in the staging area (and ready to be dispatched into the show area 132) within 144 seconds. If the ride control system 118 determines that an ride vehicle 108 from a loading slot 104 will not be able to be dispatched from the staging area 130 and arrive at the staging area within the allotted 144 seconds, the ride control system 118 can dispatch an empty ride vehicle 108 from the holding area 128 to ensure that there will be an ride vehicle 108 ready for dispatch into the show area 132 not later than 144 seconds from time t=0. The number of ride vehicles that a ride control system 118 accumulates in the staging area 130 will depend on many factors including but not limited to the desired time interval, the speed of the ride vehicles, and the distance to the staging area 132 from the holding area and various loading slots 104.

Prior to dispatching an ride vehicle 108 into the show area 132, the ride control system 118 may assign one of a plurality of ride paths (and ride profiles) to the ride vehicle 108. Assignment may be made before, during, or after dispatch of an ride vehicle 108 from its loading slot 104 or the holding area 128. FIG. 1 illustrates one example of four ride paths available in a show area 132. A fewer or greater number of ride paths are within the scope of the invention. Additionally, ride vehicles need not all start at the same location on the floor of the show area 132, nor must ride vehicles proceed serially, one after the other, from the staging area 130 into the show area 132. For example, in one embodiment, a plurality of ride vehicles may be simultaneously dispatched into the show area 132 from a plurality of entry locations on the floor of the show area 132.

Arrows 134A and 134B illustrate possible first and second paths taken by an ride vehicle 108 between the time when the ride vehicle leaves the show area 132 and enters the staging area 130.

Use of the method described herein reduces passenger wait-time during ride vehicle 108 loading operations and reduces, if not eliminates, a possibility that a passenger will be required to wait in an ride vehicle 108 before being permitted to unload from the vehicle at a conclusion of the ride. The methods described herein provide the system 100 with a flexibility not hereinbefore known to trackless ride systems.

From a passenger's perspective, the system's 100 flexibility reduces wait time prior to entering the show area 132 of a ride, reduces wait time as the passenger gets ready to unload from the ride vehicle 108 at an unloading slot 114 at the conclusion of the ride, increases passenger curiosity as return visit passengers will most likely be unable to predict on which of the plurality of ride paths the passenger's ride vehicle 108 will travel, and also be unable to predict from which of the Loading 104 and Unloading 114 Slots the passenger will begin and conclude the ride.

From an attraction operator's perspective, the system's 100 flexibility improves ride throughput (the number of passengers processed by the ride at a given time) and reduces, or eliminates, delays due to, for example, unexpectedly long times required for passengers to load or unload from an ride vehicle 108. Given all of the above, including the ability of ride vehicles to bypass other ride vehicles and for empty ride vehicles to enter a staging area 130 from the holding area 128, the system 100 prevents backups that would otherwise occur.

Figure 2:
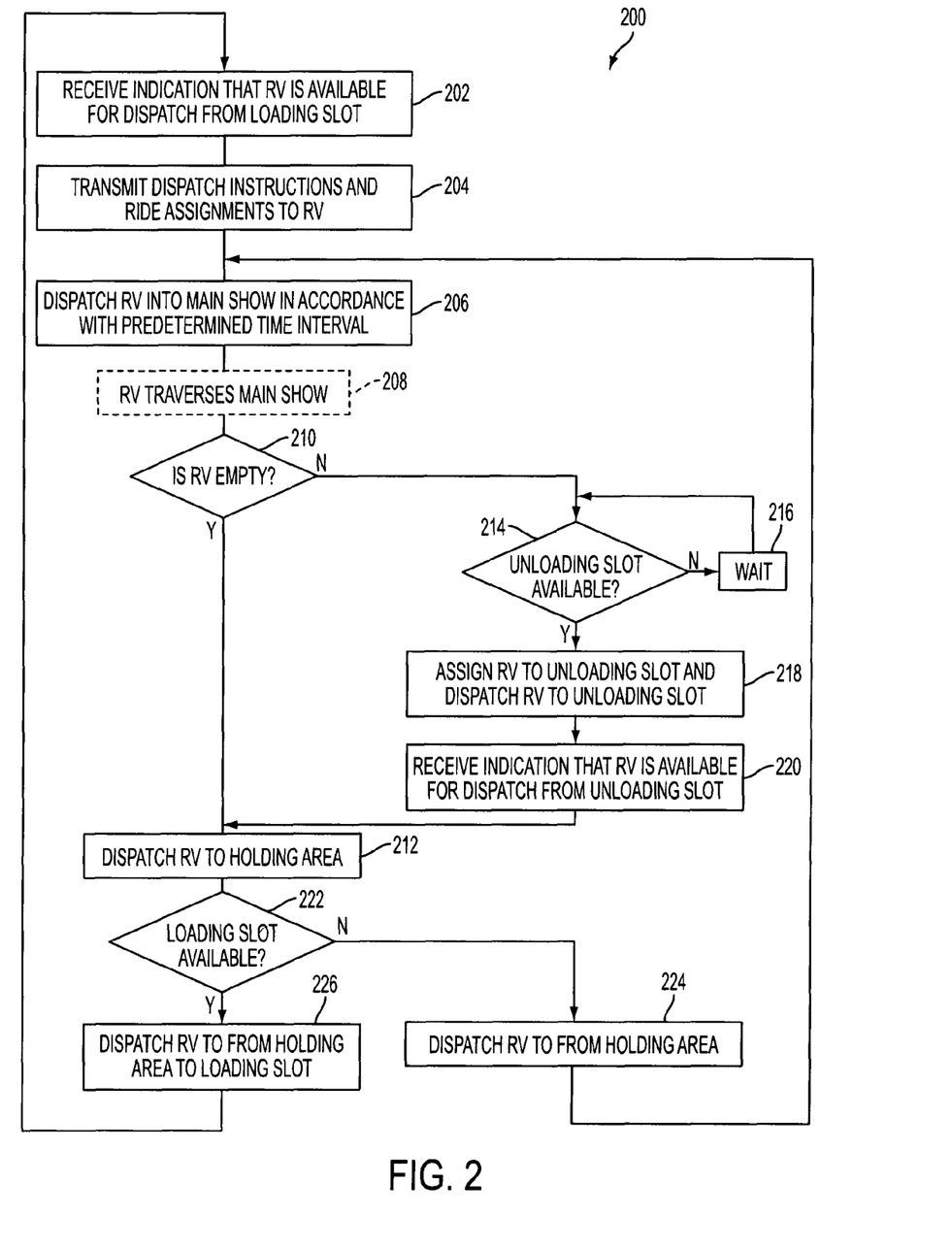
FIG. 2 is a flow diagram illustrating a method for dispatching trackless ride vehicles in a ride in accordance with an embodiment of the invention.

FIG. 2 is a flow diagram illustrating a method for dispatching trackless ride vehicles 108 in a ride in accordance with an embodiment of the invention. In accordance with the embodiment of FIG. 2, a method 200 of operating an amusement attraction ride having a plurality of trackless ride vehicles 108 may include, at 202, receiving, at a processor 120 of a ride control system 118, an indication that a ride vehicle 108 is available for dispatch from a loading slot 104 to a staging area 132. At step 204, transmitting, from the ride control system 118, one or more signals including an instruction to the available ride vehicle 108 to move away from the loading slot and proceed to the staging area 132, an assignment of a ride path, and an assignment of a ride profile. In a preferred embodiment, the ride profile is assigned before the ride vehicle is dispatched from the loading slot. In this way, passengers having a preference for an aggressive profile (e.g., a profile having abrupt transitions in direction and speed) can share a first ride vehicle, while other passengers having a preference for a non-aggressive profile (e.g., a profile having smooth slow transitions in direction and speed) can share a second ride vehicle. However, the ride profile of a given ride vehicle can be assigned after an ride vehicle is dispatched from a loading slot without departing from the scope of the invention. Similarly, if a ride profile is assigned to an empty ride vehicle that goes directly from the holding area to the staging area 132, the ride profile can be assigned before or after the ride vehicle is dispatched from the holding area. Similarly, a ride path can be assigned to an ride vehicle before or after it leaves a loading slot without departing from the scope of the invention. At 206, in accordance with a predetermined time interval, the ride control system 118 instructs the ride vehicle 108 to enter the show area 132 and traverse the show area according to its assigned ride path and ride profile. At 208, the ride vehicle 108 traverses the show area 132 according to its assigned ride path and ride profile. In accordance with a preferred embodiment, the ride vehicle propels and navigates itself, and moves its motion platform, during its traversal of the show area 132 using pre-stored data that corresponds to the assigned ride path and ride profile. A plurality of data corresponding to a plurality of ride paths and ride profiles may be pre-stored in each of the ride vehicles 108. At 210, at the conclusion of the ride path, the ride control system 118 can determine if the ride vehicle 108 held passengers or was empty. If the ride vehicle 108 was empty, then at 212 the ride control system dispatches the ride vehicle 108 to the holding area 128. If the ride vehicle 108 held passengers, at 214 the ride control system 118 can determine if there is an unloading slot 114 available for the ride vehicle 108 at an unload station 112. If there is not an unloading slot 114 available for the ride vehicle 108, then at 216 the ride control system 118 can wait for a predetermined amount of time before again determining if there is an unloading slot 114 available for the ride vehicle 108. During the predetermined waiting time, the ride control system 108 may perform other tasks. At 218, if there is an unloading slot 114 available for the ride vehicle 108, the ride control system 108 may assign the ride vehicle 108 to the available unloading slot and transmit commands to the ride vehicle to cause it to proceed to park at the available unloading slot. At 220, after receiving an indication that all passengers have unloaded from the ride vehicle 108, the ride control system 118 may transmit commands to the ride vehicle 108 to dispatch the ride vehicle 108 from the unloading slot 114 to the holding area 128. Any ride vehicle 108 dispatched to the holding area 128 may position itself within the holding area 128 in accordance with predetermined rules or, alternatively, in accordance with a command received from the ride control system 118.

At 222, the ride control system 118 determines if there are any loading slots 104 available to receive an empty ride vehicle 108. If no loading slots 104 are available, then at 224, an empty ride vehicle 108 from the holding area is dispatched from the holding area 128 to the staging area 130 and assigned a ride path (or a ride path and a ride profile) on which the empty ride vehicle 108 will traverse the show area 132. The dispatch will be made in accordance with an available time interval. The method then returns to 206.

At 226, if there are any loading slots available to receive an empty ride vehicle, then at 218, an empty ride vehicle from the holding area is dispatched from the holding area to the loading slot available to receive the empty ride vehicle. The method then returns to step 202.

Figure 3A:
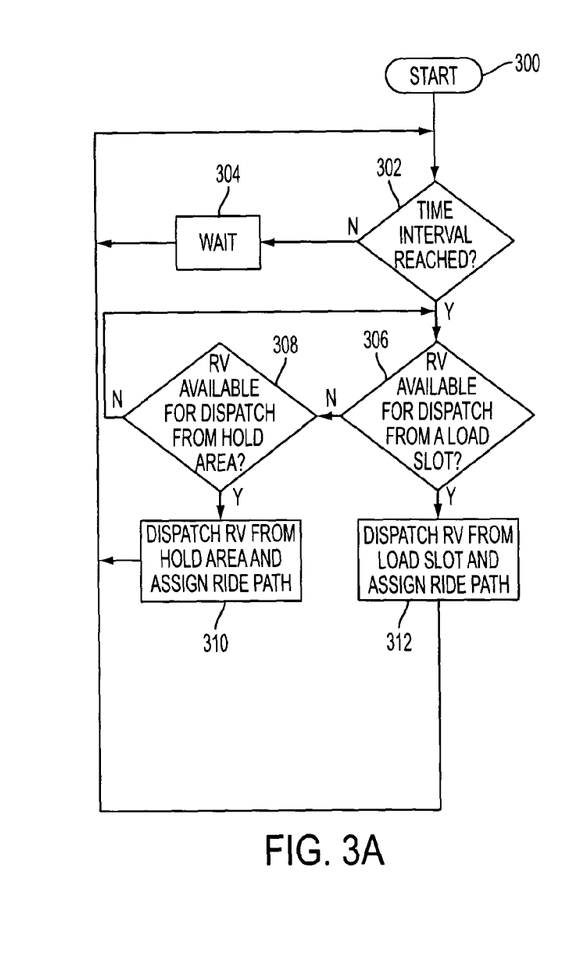
FIG. 3A is a flow diagram illustrating a method for dispatching trackless ride vehicles in an amusement park attraction ride in accordance with another embodiment of the invention.
Figure 3B:
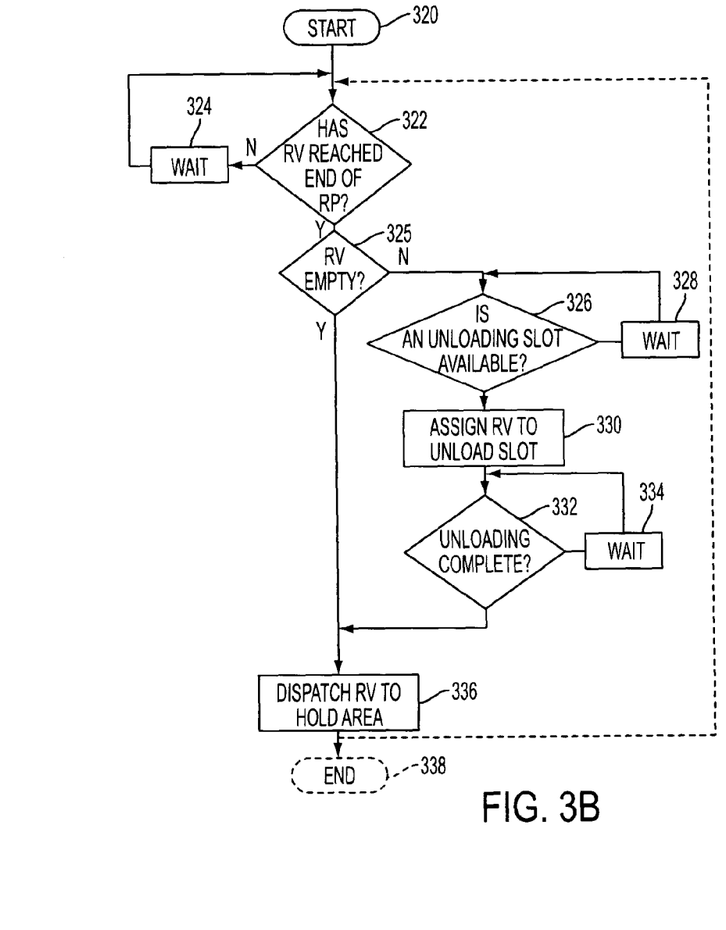
FIG. 3B is a flow diagram illustrating a method of managing ride vehicles at the conclusion of a ride in accordance with an embodiment of the invention.

FIG. 3A is a flow diagram illustrating a method for dispatching trackless ride vehicles in an amusement park attraction ride in accordance with another embodiment of the invention. FIG. 3B is a flow diagram illustrating a method of managing ride vehicles at the conclusion of a ride.

In FIG. 3A, the method may begin at 300. At 302, a ride control system determines if a predetermined amount of time since an immediately prior dispatch of a ride vehicle into the attraction has been reached. If this predetermined time interval was not reached, then, at 304, the ride control system may wait a predetermined amount of time before again determining if a predetermined amount of time since the immediately prior dispatch of a ride vehicle into the attraction has been reached. If, at 302, the ride control system determines that the time interval was reached, then, at 306, the ride control system may determine if there is an ride vehicle available for dispatch from a loading slot. The determination may be made in any number of ways, including determining if a signal indicative of the availability of a ride vehicle for dispatch from the loading slot was transmitted to the ride control system from the load station of the loading slot.

If at 306, there was not a ride vehicle available for dispatch from a loading slot, then, at 308, the ride control system might determine if there were any ride vehicles available for dispatch from the holding area. If at 308, there were no ride vehicles available for dispatch from the holding area, the method might return to step 306. If at 308, there was an ride vehicle available for dispatch from the holding area (but not from a loading slot), the ride control system might, at 310, transmit a signal to the available ride vehicle, the signal might include an instruction to the available ride vehicle to move out of the holding area and traverse the ride according to a given ride path. The method might then return to step 302.

If at 306, there was a ride vehicle available for dispatch from a loading slot, then, at 312, the ride control system might transmit a signal to the available ride vehicle, the signal might include an instruction to the available ride vehicle to move out of the loading slot and traverse the attraction according to a given ride path. The method might then return to step 302.

FIG. 3B is a flow diagram illustrating a method of managing ride vehicles at the conclusion of a ride. The method begins at 320. At 322, the ride control system may determine if an ride vehicle has reached the end of a ride path. If At 322, the ride control system determines that the ride vehicle has not reached the end of a ride path, the ride control system may wait, at 324, a predetermined amount of time before again returning to step 322. If, at 322, the ride control system determines that the ride vehicle has reached the end of a ride path, the ride control system may, at 325, determine if the ride vehicle was empty (i.e., traveled through the show area 132 without passengers). If, at 325, the ride control system determines that the ride vehicle was empty, the method proceeds to 336. If, at 325, the ride control system determines that the ride vehicle was not empty (i.e., traveled through the show area 132 with passengers), the method proceeds to 326.

At 326, the ride control system determines if there is an unloading slot available at an unload station for the ride vehicle. If, at 326, the ride control system determines that there is not an unloading slot available at an unload station, the ride control system may wait, at 328, a predetermined amount of time before again returning to step 326. If, at 326, the ride control system determines that there is an unloading slot available at an unload station, the ride control system may assign the ride vehicle to the unloading slot at 330.

At 332, if the ride control system determines if the unloading of the ride vehicle at the given unloading slot is complete. If not complete, at 334, the ride control system may wait for a predetermined amount of time before returning to step 332. If, however, at 332, the ride control system determines that the unloading of the ride vehicle at the given unloading slot is complete, the method may, at 336, cause the ride vehicle to be dispatched to the holding area. The method may end at 338. Alternatively, as shown by the dashed line, the method may return to 322, and be performed for the next ride vehicle that has reached the end of the ride path. If the alternative method was employed, the method would not end and the "End" terminator 338 could be eliminated.

The following is an additional description of a system, similar to 100, comprising ride vehicles and a ride control system. The system operates in a ride attraction including predetermined loading, unloading, holding, and staging areas. Additional, even duplicative areas may be provided. For example, a second holding area may be designated for maintenance of ride vehicles, and/or multiple staging areas may permit ride vehicles to enter a common show area 132 from different locations.

Similar to that described above, a ride vehicle in a loading slot may be loaded with passengers and prepared for ride dispatch. If multiple loading slots are available, multiple ride vehicles in respective multiple loading slots may be loaded with passengers and prepared for ride dispatch.

In one embodiment, the ride control system may dispatch a ride vehicle from the loading slot it presently occupies after all passengers are secured into the ride vehicle. In this embodiment, the ride control system may dispatch the ride vehicle to a staging area, which is outside of the show area 132, prior to dispatching the ride vehicle into the show area 132. However, in an alternate embodiment, the ride control system may dispatch the ride vehicle directly into the show area 132 from its loading slot. The ride control system may assign the ride vehicle a ride path to follow. The ride control system may additionally assign the ride vehicle a ride profile to follow. The assignments can be made substantially simultaneously, or at any time prior to entry of the ride vehicle into the show area 132 of the ride.

In the embodiment, the ride control system dispatches ride vehicles from the staging area into the show area 132 in a periodic manner in accordance with the show's time interval. However, in the alternate embodiment, the ride control system dispatches ride vehicles directly into the show area 132 from their loading slots in a periodic manner in accordance with the show's time interval. In any embodiment, it is possible that the number of ride vehicles ready for dispatch into the show area 132 falls below a number that would ensure a constant flow of ride vehicles into the show area 132 in accordance with the time interval. For example, it is possible that the ride control system determines that there will be no ride vehicles having passengers secured therein in the staging area when it becomes time to dispatch the next ride vehicle into the show area 132 of the ride (in accordance with the show's time interval). This situation would lead to a backup of the ride, because ride vehicles unloading passengers may not be able to return to the load station if there are no available loading slots. To overcome this problem, according to one embodiment of the invention, if the ride control system determines that there will not be a ride vehicle in the staging area in time for the next dispatch into the show area 132 according to a current time interval, the ride control system may dispatch an empty (i.e., having no passengers) ride vehicle into the staging area for the next dispatch into the show area 132 of the ride. In the alternate embodiment, where a staging area may not be used, if the ride control system determines that there will not be a ride vehicle available for dispatch from a loading slot in time for the next dispatch into the show area 132 according to the current time interval, the ride control system may dispatch an empty (i.e., having no passengers) ride vehicle from the holding area directly into the show area 132 according to the current time Interval. Ensuring that a ride vehicle, regardless of whether it contains passengers, is dispatched into the show area 132 of the ride at the beginning of every time interval allows for a continuous flow of the entire fleet of ride vehicles through the ride without having ride vehicles backing up at any point in the ride.

Once assigned a ride path, the ride vehicle may follow that path for the entire show. At the end of the ride path, if the ride vehicle contains passengers, the ride control system may assign the ride vehicle to an unloading slot for the purpose of unloading the passengers. This assignment may be based on which unloading slot(s) is available at the unload station. If, however, the ride vehicle does not contain passengers, then the ride vehicle may be assigned to proceed to a given location in a holding area or to return to an available slot in the loading area or to proceed back to the show area (possibly via the staging area).

If the ride vehicle had passengers, and once the unloading process is complete, the ride control system may dispatch the empty ride vehicle (i.e., a ride vehicle not containing passengers) from the unload station to the holding area.

Each of the one or more ride vehicles in the holding area will be assigned to a loading slot by the ride control system to begin the loading process again.

Unlike a track based ride that does not allow cars to bypass a loading area if the departure of a car presently in the loading area is delayed (e.g., "linear loading"), the trackless based ride described herein is unique because ride vehicles that are not ready for dispatch, from an unloading slot, a loading slot, or from the holding area, are skipped until they become ready. If no ride vehicles in the load station are ready for dispatch into the ride at a time that would allow for the ride control system to maintain the show's time interval, then an empty ride vehicle from the holding area is preferably assigned to a ride path and sent through the show empty. Use of an empty ride vehicle in this manner permits the ride control system to maintain the ride's time interval, and prevents a backup of the ride due to a backup of ride vehicles at any location in the ride. Therefore, in accordance with an embodiment of the invention, an empty ride vehicle fills a time interval slot that would otherwise result in a lengthening of the time between at least two successive ride vehicles entering the main part of the ride.

At the conclusion of the ride, ride vehicles that entered the ride without passengers will be directed to the holding area. However, ride vehicles that contain passengers must wait for an available unloading slot and cannot bypass the unload station before heading to the holding area.

Unlike a traditional linear loading methodology, ride vehicles according to the present invention are assigned to a ride path by the ride control system based on the time interval. Therefore, a specific ride vehicle or a specific loading slot does not dictate the ride path, and an abnormally long load time for a ride vehicle does not preclude continuous flow of the ride. The ride control system assigns each ride vehicle an unloading slot and/or loading slot based on availability (i.e., which slot is open at the time the ride vehicle enters the station).

The present invention has been described above in terms of one or more preferred embodiments and one or more alternate embodiments. Moreover, various aspects of the present invention have been described. One of ordinary skill in the art should not interpret the various aspects or embodiments as limiting in any way, but as exemplary. Clearly, other embodiments are within the scope of the present invention. The scope the present invention will instead be determined by the appended claims.

What is claimed is:

1. A method of controlling a plurality of trackless vehicles, comprising:
controlling, by a controller, a number of trackless vehicles within a first predefined area in order to achieve a throughput value,
wherein the controlling comprises:
establishing a time interval based on the throughput value;
dispatching one of the plurality of trackless vehicles into the first predefined area at a beginning of each time interval;
routing each of the number of trackless vehicles within the first predefined area along a dynamic path based on its position in the first predefined area and a remaining time within the time interval since its dispatch into the first predefined area;
determining, by the controller, if a first amount of time has passed since the controller routed one of the plurality of trackless vehicles from a second predefined area onto one of a plurality of paths leading to the first predefined area,
wherein the first amount of time is based on the time interval and the number of trackless vehicles in the plurality of trackless vehicles outside of the first predefined area, and
when the first amount of time has passed:
determining, by the controller, a next available one of the plurality of trackless vehicles available for dispatch from the second predefined area onto one of the plurality of paths leading to the first predefined area; and
dispatching the next available one of the plurality of trackless vehicles onto one of the plurality of paths leading to the first predefined area.

2. The method of claim 1, wherein the time interval is fixed or variable.

3. The method of claim 1, wherein the destination of the plurality of trackless vehicles upon dispatch from the second predefined area is a staging area prior to the first predefined area.

4. The method of claim 1, wherein the next available trackless vehicle is positioned, prior to routing, at a location separate from a previously routed trackless vehicle's position prior to routing.

5. The method of claim 1, wherein the routing each of the number of trackless vehicles within the first predefined area includes an initial path set at the time of dispatching into the first predefined area.

6. A method of controlling a plurality of trackless vehicles, comprising:
transmitting, from a controller, a first instruction to a first one of the plurality of trackless vehicles to begin travel at a first time along a corresponding one of a plurality of paths leading to a predefined area;
transmitting, from the controller, when the first trackless vehicle has traveled to an end of the corresponding path, a second instruction to the first trackless vehicle regarding travel along a predefined area path in order to achieve a time interval between the first trackless vehicle and a second trackless vehicle,
wherein the time interval is based on the throughput value,
wherein the second instruction comprises dynamic routing along dynamic paths based on the position of the first trackless vehicle in the predefined area and a remaining time within the time interval since the first trackless vehicle was dispatched into the predefined area, and
wherein the first time is based on the time interval and the number of trackless vehicles in the plurality of trackless vehicles outside of the predefined area.

7. The method of claim 6, wherein the first time is established according to a time interval which maximizes a number of trackless vehicles traveling through the predefined area during a given time period.

8. The method of claim 7, wherein the first time interval is fixed or variable.

9. The method of claim 6, wherein the first instruction is based on a time interval and the second instruction is based on event conditions.

10. The method of claim 6, wherein each of a plurality of paths leading to the predefined area includes at least one of a first station and a second station.

11. The method of claim 6, wherein the first trackless vehicle is a ride vehicle; and
if the ride vehicle carried passengers into the predefined area, then the ride vehicle proceeds to a first station for passenger unloading;
if the ride vehicle did not carry passengers into the predefined area, then the ride vehicle proceeds to any available station; and
if the ride vehicle did not carry passengers into the predefined area, and there is no available station, the ride vehicle proceeds to the staging area.

12. The method of claim 11, wherein the second station is a passenger loading station.

13. The method of claim 6, wherein the dynamic routing includes an initial path set at the time of dispatching the first trackless vehicle into the predefined area.

14. A system to maximize a number of trackless vehicles traveling through a first predefined area during a given time period, the system comprising:
a plurality of trackless vehicles, each configured to dynamically navigate the first predefined area;
a first station in a second predefined area to receive at least a first one of the plurality of trackless vehicles; and
a controller to periodically route trackless vehicles from the first station towards the first predefined area in accordance with a first time interval,
wherein, either:
a first one of the plurality of trackless vehicles begins to navigate along a first one of a plurality of paths leading to the first predefined area at the first time interval, or
a next available one of the plurality of trackless vehicles begins to navigate along a second one of the plurality of paths leading to the first predefined area at the first time interval,
wherein the controller controls the plurality of trackless vehicles within the first predefined area in order to achieve a throughput value, and
wherein the controlling comprises:
establishing a second time interval based on the throughput value;
dispatching one of the plurality of trackless vehicles into the first predefined area at a beginning of each second time interval; and
routing each of the plurality of trackless vehicles within the first predefined area along a dynamic path based on its position in the first predefined area and a remaining time within the second time interval since its dispatch into the first predefined area.

15. The system of claim 14, wherein the time interval is fixed or variable.

16. The system of claim 14, further comprising:
a second station to receive at least one of the plurality of trackless vehicles.

17. The system of claim 16, further comprising:
a third station,
wherein one of the plurality of trackless vehicles begins to navigate along a third one of the plurality of paths to the third station at the first time interval.

18. The system of claim 16, wherein an order of departure of trackless vehicles from the second station is not dependent on an order of arrival of the trackless vehicles at the second station.

19. The system of claim 16, wherein the first and second stations each comprise multiple slots, and wherein each slot is configured to receive one of the plurality of trackless vehicles.

20. The system of claim 14, wherein an order of departure of trackless vehicles from the first station is not dependent on an order of arrival of the trackless vehicles at the first station.

21. The system of claim 14, wherein the controller dispatches one or more of the plurality of the trackless vehicles into the first predefined area at the same time.

22. The system of claim 14, wherein the routing each of the plurality of trackless vehicles within the first predefined area includes an initial path set at the time of dispatching into the first predefined area.

* * * * *